(12) United States Patent
Honda et al.

(10) Patent No.: US 10,839,800 B2
(45) Date of Patent: Nov. 17, 2020

(54) INFORMATION PROCESSING APPARATUS

(71) Applicant: Sony Interactive Entertainment Inc., Tokyo (JP)

(72) Inventors: Shinichi Honda, Saitama (JP); Megumi Kikuchi, San Mateo, CA (US); Takashi Satake, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 157 days.

(21) Appl. No.: 16/087,924

(22) PCT Filed: Apr. 7, 2016

(86) PCT No.: PCT/JP2016/061385
§ 371 (c)(1),
(2) Date: Sep. 24, 2018

(87) PCT Pub. No.: WO2017/175351
PCT Pub. Date: Oct. 12, 2017

(65) Prior Publication Data
US 2019/0096401 A1    Mar. 28, 2019

(51) Int. Cl.
*G10L 25/63*  (2013.01)
*G10L 15/22*  (2006.01)
(Continued)

(52) U.S. Cl.
CPC .............. *G10L 15/22* (2013.01); *G06F 3/167* (2013.01); *G06F 40/242* (2020.01);
(Continued)

(58) Field of Classification Search
CPC ......... G10L 25/63; G10L 25/00; G10L 25/03; G10L 25/27; G10L 25/45; G10L 25/48; G10L 25/57; G10L 25/60; G10L 25/75
(Continued)

(56) References Cited

U.S. PATENT DOCUMENTS 6,067,521 A * 5/2000 Ishii ................... G01C 21/3608
701/532
8,086,449 B2   12/2011 Ishii
(Continued)

FOREIGN PATENT DOCUMENTS

JP   08146991 A    6/1996
JP   2006343661 A  12/2006
(Continued)

OTHER PUBLICATIONS

International Search Report for corresponding PCT Application No. PCT/JP2016/061385, 4 pages, dated Jun. 21, 2016.
(Continued)

*Primary Examiner* — Qi Han
(74) *Attorney, Agent, or Firm* — Matthew B. Dernier, Esq.

(57) ABSTRACT

An information processing apparatus by which smooth communication with a user by voice can be implemented is provided. The information processing apparatus presents a plurality of choices to the user, recognizes utterance contents of the user for selecting one of the plurality of choices, and specifies the choice selected by the user based on whether or not a phrase included in the recognized utterance contents of the user corresponds to a phrase included in a dictionary corresponding to each of the plurality of choices prepared in advance.

14 Claims, 3 Drawing Sheets

(51) Int. Cl.
G10L 13/00 (2006.01)
G10L 15/10 (2006.01)
G10L 15/28 (2013.01)
G06F 40/58 (2020.01)
G06F 40/242 (2020.01)
G06F 40/289 (2020.01)
G06F 3/16 (2006.01)
G10L 15/19 (2013.01)

(52) U.S. Cl.
CPC ............ *G06F 40/289* (2020.01); *G06F 40/58* (2020.01); *G10L 13/00* (2013.01); *G10L 15/10* (2013.01); *G10L 15/19* (2013.01); *G10L 15/28* (2013.01); *G10L 25/63* (2013.01); *G10L 2015/223* (2013.01)

(58) Field of Classification Search
USPC .... 704/275, 270, 270.1, 276, 257, 258, 266, 704/231, 235, 251
See application file for complete search history.

(56) References Cited

U.S. PATENT DOCUMENTS

2009/0089051 A1    4/2009  Ishii
2012/0232886 A1*   9/2012  Capuozzo ............... G10L 15/22 704/9
2014/0046891 A1*   2/2014  Banas .................... G06N 5/022 706/46
2016/0063993 A1*   3/2016  Dolan ................... G06F 40/279 704/254

FOREIGN PATENT DOCUMENTS

| | | |
|---|---|---|
| JP | 2007065226 A | 3/2007 |
| JP | 2009271258 A | 11/2009 |
| JP | 2010054549 A | 3/2010 |
| JP | 2011171948 A | 9/2011 |
| JP | 2013114020 A | 6/2013 |

OTHER PUBLICATIONS

Kikuo Maekawa, et al., "Voice-Quality Analysis of Japanese Filled Pauses: A Preliminary Report" Dept. Corpus Studies, National Institute for Japanese Language and Linguistics ††Graduate School of Engineering, Utsunomiya University 4 pages, [online], [searched Nov. 16, 2015], Internet <URL: http://www2.ninjal.ac.jp/kikuo/Maekawa-DISS2015.pdf.

International Preliminary Report on Patentability and Written Opinion for corresponding PCT Application No. PCT/JP2016/061385, 16 pages, dated Oct. 18, 2018.

* cited by examiner

INFORMATION PROCESSING APPARATUS

TECHNICAL FIELD

The present invention relates to an information processing apparatus, an information processing method, a program, and an information storage medium that accept an input by voice from a user.

BACKGROUND ART

An information processing apparatus is known which accepts voice uttered by a user and executes information processing in response to contents of the voice. According to such a technology as just described, the user can input various instructions or information by voice in place of inputting letters through a keyboard or a touch panel using the hands. Also a technology for reading information other than the contents of an utterance of a user such as an emotion, an attitude or the like from the utterance of the user is researched (refer, for example, to NPL 1).

CITATION LIST

Non Patent Literature

[NPL 1] Kikuo Maekawa and Hiroki Mori, "VOICE-QUALITY ANALYSIS OF JAPANESE FILLED PAUSES: A PRELIMINARY REPORT," [online], [searched Nov. 16, 2015], Internet <URL:http://www2.ninjal.acjp/kikuo/Maekawa-DISS2015.pdf>

SUMMARY

Technical Problems

In the technology of the related art described above, there are various subjects in implementing smooth communication between a user and an information processing apparatus. For example, when voice of the user is to be accepted, it is necessary to recognize contents of an utterance of the user with high accuracy. However, if fully free utterance is allowed to the user, then it becomes difficult to accurately recognize contents of an utterance of the user. Therefore, in the case where information to be accepted from the user is restricted in terms of the type, it can also be considered to present choices to the user to restrict contents to be uttered by the user to the choices. However, if the contents of the utterance of the user are restricted only to the choices, then the utterance of the user becomes mechanical and the emotion or the attitude of the user becomes less likely to appear in the contents of the utterance. Therefore, in the case where it is desired to allow the user to utter naturally, it is not desirable to restrict the contents of the utterance of the user only to the choices.

Further, in the case where the information processing apparatus reproduces speech to the user by voice prior to utterance of the user, the user cannot start utterance until after the reproduction of the speech ends. Therefore, if the information processing apparatus performs speech in which the user is not interested or the like, then smooth communication may possibly be damaged.

The present invention has been made in view of such actual circumstances as described above, and one of objects of the present invention is to provide an information processing apparatus, an information processing method, a program, and an information storage medium by which smooth communication with a user by voice can be implemented.

Solution to Problems

An information processing apparatus according to the present invention includes a choice presentation unit configured to present a plurality of choices to a user, a speech recognition unit configured to recognize utterance contents of the user for selecting one of the plurality of choices, and a selection result specification unit configured to specify the choice selected by the user based on whether or not a phrase included in the recognized utterance contents of the user corresponds to a phrase included in a dictionary corresponding to each of the plurality of choices prepared in advance.

Another information processing apparatus according to the present invention includes a reproduction unit configured to reproduce speech to be presented to a user by voice, and a speech recognition unit configured to recognize utterance contents of the user. Where the speech recognition unit detects the utterance of the user during the reproduction of the speech, the reproduction unit stops the reproduction of the speech.

An information processing method according to the present invention includes a step of presenting a plurality of choices to a user, a step of recognizing utterance contents of the user for selecting one of the plurality of choices, and a step of specifying a choice selected by the user based on whether or not a phrase included in the recognized utterance contents of the user corresponds to a phrase included in a dictionary corresponding to each of the plurality of choices prepared in advance.

A program according to the present invention is a program for causing a computer to function as a choice presentation unit configured to present a plurality of choices to a user, a speech recognition unit configured to recognize utterance contents of the user for selecting one of the plurality of choices, and a selection result specification unit configured to specify the choice selected by the user based on whether or not a phrase included in the recognized utterance contents of the user corresponds to a phrase included in a dictionary corresponding to each of the plurality of choices prepared in advance. This program may be stored in and provided as a computer-readable non-transitory information storage medium.

DESCRIPTION OF EMBODIMENT

In the following, an embodiment of the present invention is described in detail with reference to the drawings.

Figure 1:
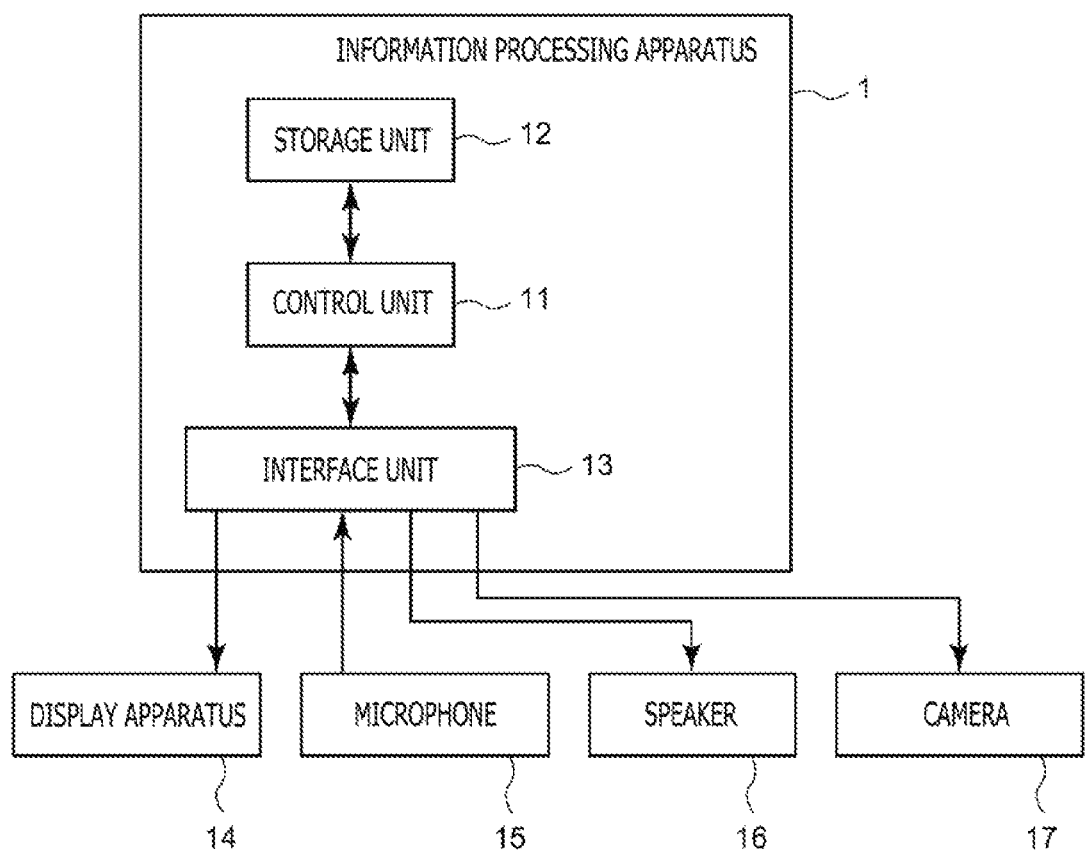
FIG. 1 is a configuration block diagram depicting a configuration of an information processing apparatus according to an embodiment of the present invention.

FIG. 1 is a configuration block diagram depicting a configuration of an information processing apparatus 1 according to one embodiment of the present invention. The information processing apparatus 1 is, for example, a household game machine or a potable game machine, a personal computer, a smartphone or the like and is configured including a control unit 11, a storage unit 12, and an interface unit 13 as depicted in FIG. 1. Further, the information processing apparatus 1 is connected to a display apparatus 14, a microphone 15, a speaker 16, and a camera 17.

The control unit 11 is configured including a central processing unit (CPU) and so forth and executes programs stored in the storage unit 12 to execute various information processes. In the present embodiment, a particular example of a process executed by the control unit 11 is hereinafter described. The storage unit 12 includes a memory device such as a random access memory (RAM) or the like and stores programs to be executed by the control unit 11 and data processed by the programs. The interface unit 13 is an interface for allowing the information processing apparatus 1 to provide and receive various kinds of information to and from the display apparatus 14, the microphone 15, the speaker 16, and the camera 17.

The display apparatus 14 is a head-mounted display, a home-use television set receiver, a liquid crystal display or the like and displays an image according to a video signal output from the information processing apparatus 1 on a screen thereof. Especially in the case where the display apparatus 14 is a device of a type that covers the field of vision of the user like a head-mounted display, since the user cannot view its hands, the user is less easy to operate an operation inputting device such as a controller or the like by a hand. Therefore, where the information processing apparatus 1 accepts an input of information by voice of the user as hereinafter described, the user can perform inputting of information easily even in a situation in which the user cannot confirm its hands. The microphone 15 outputs a sound signal obtained by collecting voices emitted by a user of the information processing apparatus 1 to the information processing apparatus 1. The speaker 16 emits sound in accordance with the sound signal output from the information processing apparatus 1. The camera 17 picks up a video indicative of a manner of the user and inputs the picked up video to the information processing apparatus 1. It is to be noted that the display apparatus 14, the microphone 15, and the speaker 16 may all be built in a housing of the information processing apparatus 1 or may be separate apparatus connected by a wire or wirelessly to the information processing apparatus 1.

Further, the information processing apparatus 1 may be connected to a device that includes a posture detection sensor such as a three-axis acceleration sensor, a geomagnetism sensor or the like in order to detect a motion of the head of the user. Where the user wears such a device as just described, a motion of the head of the user can be detected. Further, the information processing apparatus 1 may be connected to an operation inputting device (controller or the like) that accepts an operation input of the user.

Figure 2:
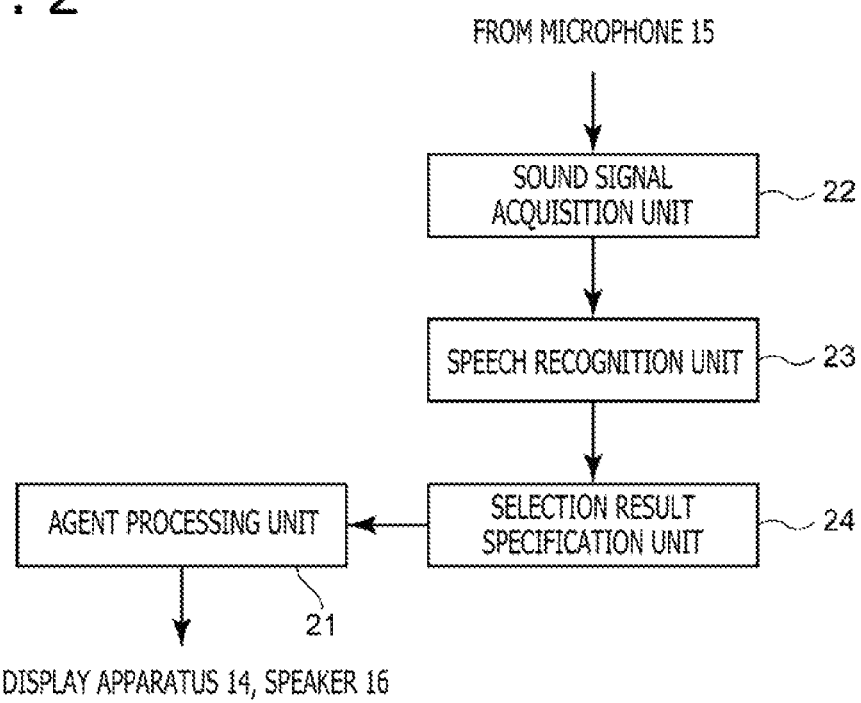
FIG. 2 is a functional block diagram depicting functions of the information processing apparatus according to the embodiment of the present invention.

In the following, functions implemented by the information processing apparatus 1 are described with reference to FIG. 2. As depicted in FIG. 2, the information processing apparatus 1 is functionally configured including an agent processing unit 21, a sound signal acquisition unit 22, a speech recognition unit 23, and a selection result specification unit 24. The functions mentioned can be implemented by the control unit 11 operating in accordance with a program stored in the storage unit 12. This program may be provided to the information processing apparatus 1 through a communication network such as the Internet or the like or may be stored in and provided as a computer-readable information storage medium such as an optical disk or the like.

The agent processing unit 21 implements a virtual agent that performs communication with the user and executes a conversation process with the user by the agent. In particular, the agent processing unit 21 performs, as part of conversation, presentation of choices to the user and acceptance of a selection of the user from the among choices. In the present embodiment, the agent processing unit 21 presents choices to the user by displaying a plurality of choices on the screen of the display apparatus 14.

Figure 3:
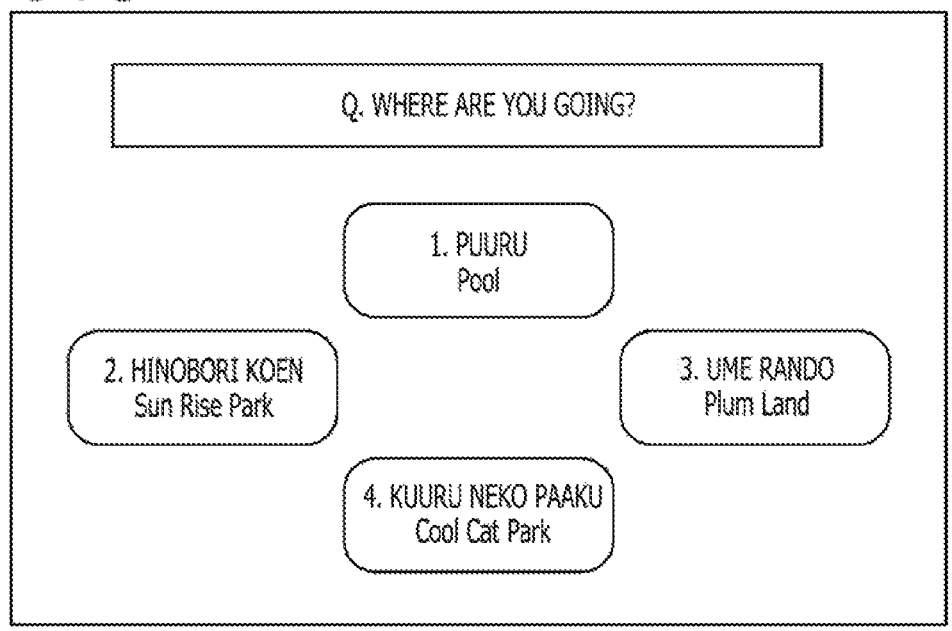
FIG. 3 is a view depicting an example of a screen that displays choices.

FIG. 3 depicts an example of a screen image that displays choices. In the example of this figure, a question of "Where are you going?" from the agent to the user and four choices of "pool," "sun rise park," "plum land," and "cool cat park" as candidates for an answer to the question are presented. Furthermore, in this example, for phrases of the choices in Japanese, phrases in English translation and labels (here, numerals) for identifying the choices are displayed in a juxtaposed relationship with each other. Further, in the example of this figure, the four choices are not juxtaposed in order from above but are disposed in the four upward, downward, leftward, and rightward directions as viewed from the center of the screen. It is to be noted that the agent processing unit 21 may reproduce a plurality of choices in order as voice from the speaker 16 in place of displaying the choices in the screen image. Further, while the choices are displayed on the screen, only the question may be reproduced as speech.

If such choices as exemplified in FIG. 3 are presented, then the user would perform utterance regarding contents to be selected by the user from among the choices. In the following, the utterance performed by the user in response to the presentation of the choices is referred to as selection utterance. Further, a choice selected by the user is referred to as selection result. As hereinafter described, in the present embodiment, contents of a selection utterance of the user may not necessarily coincide with the phrase itself of the choice. Contents of the selection utterance are processed by the sound signal acquisition unit 22, the speech recognition unit 23, and the selection result specification unit 24, and the selection result specification unit 24 thereby specifies a selection result of the user. The agent processing unit 21 uses information of the specified selection result to determine succeeding contents of speech of the agent. Then, the agent processing unit 21 generates a sound signal for speaking the determined speech contents of the agent and outputs the sound signal to the speaker 16. Consequently, the speech of the agent is reproduced as sound from the speaker 16. The agent processing unit 21 may cause the speech of the agent to be displayed on the screen of the display apparatus 14 in place of reproducing the same as sound.

The agent processing unit 21 may calculate various feature amounts indicative not only of a selection result of the user but also of a feature of a selection utterance and determine contents of succeeding speech of the agent using a result of the calculation. Further, the agent processing unit 21 may determine contents of speech of the agent using information regarding a facial expression or a motion of the user picked up by the camera 17. It is considered that, also in the case where the user performs selection from among choices, various emotions in whether the selection has been performed positively or passively or the like are involved. The agent processing unit 21 can determine feature amounts relating to various kinds of para-language information, non-verbal information and so forth that reflect an emotion or thinking of the user by analyzing the selection utterance itself or the manner of the user when the selection utterance is performed by the user. By determining a later behavior of the agent using such feature amounts as described above, the agent processing unit 21 can implement natural communication close to conversation between persons in comparison with that in an alternative case in which presentation of choices and acceptance of a selection result are merely performed.

Further, the agent processing unit 21 may not only reproduce speech of the agent as sound but also display an image of a character or the like representative of the agent on the screen of the display apparatus 14. Furthermore, a video indicative of a manner in which this character moves in response to contents of the utterance of the user, contents of speech of the agent or the like may be displayed.

The sound signal acquisition unit 22 acquires a sound signal collected by the microphone 15 and outputs the sound signal to the speech recognition unit 23. In the present embodiment, the sound signal acquisition unit 22 acquires a sound signal including the voice of the user who responds to a question of the agent.

The speech recognition unit 23 specifies contents of an utterance of the user by analyzing a sound signal acquired by the sound signal acquisition unit 22. Such specification of the utterance contents can be implemented using various known speech recognition technologies such as a statistical method using a hidden Markov model, a dynamic time expansion and contraction method or the like. The specified utterance contents of the user are used for specification of a selection result by the selection result specification unit 24.

It is to be noted that the speech recognition unit 23 may not execute the speech recognition process after the user ends the utterance but may execute the speech recognition process at any time while the user is uttering. In this case, while the user continues the utterance, the speech recognition unit 23 executes the speech recognition process for sound signals for a predetermined period of time successively acquired by the sound signal acquisition unit 22 and specifies to which phonemes the sound signals for the predetermined period of time correspond. By repetitively executing such processes as described above together with lapse of time, the utterance contents of the user can be specified on the real-time basis.

The selection result specification unit 24 specifies a selection result of the user in response to contents of the selection utterance specified as a result of the speech recognition by the speech recognition unit 23. Here, in the case where the user utters a phrase itself (for example, "pool" or the like) presented as a choice and the phrase is recognized correctly by the speech recognition unit 23, the selection result specification unit 24 may specify the choice uttered by the user as it is as a selection result. However, the user may not necessarily utter a phrase of a choice as it is. Further, even in the case where the user utters a phrase of a choice as it is, from the problem of ambient noise, speaking of the user itself, accuracy of the speech recognition process and so forth, the utterance contents of the user may not always be recognized accurately by the speech recognition unit 23. Therefore, the selection result specification unit 24 executes various decision processes on the basis of a result of the speech recognition by the speech recognition unit 23 to specify a selection result of the user.

In the following, particular examples of a process executed by the selection result specification unit 24 to specify a selection result are described. First, particular examples in which a dictionary is utilized to specify a selection result are described.

As a first example in which a dictionary is used, an example is described in which a related word dictionary corresponding to each of a plurality of choices is used. In this example, for each of phrases of choices, a related word dictionary including a phrase itself of a choice and a phrase related to the phrase is prepared in advance. For example, in the case where a phrase of a choice is a proper noun, the related word dictionary may include a short name, a nickname and so forth. In the case where utterance contents of the user recognized by the speech recognition unit 23 coincide with one of the phrases registered in the related word dictionary, the selection result specification unit 24 decides that a choice corresponding to the related word dictionary is selected. By registering various expressions for a same phrase in the related word dictionary in advance, also in the case where the displayed choice is uttered in a different expression by the user, the selection result of the user can be specified.

Further, the related word dictionary may include translation words obtained by translating words of choices or related phrases of them into various languages. Although, in the example of FIG. 3, phrases of choices are displayed in both Japanese and English, translation expressions of the phases of the choices are registered in other foreign languages in the related word dictionary. If the related word dictionary is registered in this manner, then even in the case where the user utters contents of a choice in a foreign language, a result of the selection can be specified. It is to be noted that the related word dictionary may include not only translation expressions of foreign languages but also the phrases of the choices as expressed in various regional dialects. Further, even if letters themselves of a phrase are same, depending upon a user, the intonation upon utterance differs, and there is the possibility that the phrase may be recognized as a phrase by speech recognition process depending upon such a difference in intonation as described above. Therefore, the related word dictionary may include expressions of a same phrase uttered in various intonations. Further, the related word dictionary may include, in addition to regular English expressions, English corrupted by Japanese (so-called katakana English).

Now, as a second example in which a dictionary is used, an example is described in which a label dictionary indicating labels to be added to choices is used. In this example, when the agent processing unit 21 displays each choice, it displays a label added to the choice for identifying the choice. In the example of FIG. 3, a label of a numeral is added to each choice. In this case, the user may utter, in place of a phase of a choice, a phrase representative of the label applied to the choice. For example, in the case where the user wants to select a pool in the example of FIG. 3, the user may utter "one." The label to be applied to a choice is not limited to a numeral but may be any of various types such as alphabets or Greek letters ("α," "β" and so forth), phonetic codes ("Alfa," "Bravo" and so forth), Japanese syllabary ("a," "i," "u," "e" and so forth), iroha Kanas ("i," "ro," "ha," "ni" and so forth). Further, the label may be such a symbol as "○," "Δ," "□" or the like. In this case, the user can select a choice by uttering like "circle," "triangle" or the like.

In this second example, label dictionaries in which phrases corresponding to labels are registered are prepared such that, when the agent processing unit 21 presents choices with labels applied thereto, label dictionaries including phrases indicative of the labels applied to the choices are associated. In the case where utterance contents of the user coincide with a phrase included in a label dictionary, the selection result specification unit 24 specifies the choice to which the label is added as a selection result. Similarly as in the example of the related word dictionary, not only a phrase that directly represents a label such as "one" or "circle" but also phrases that are translations of the phrase in various languages, phrases different in intonation and so forth may be included in the label dictionary.

Further, the label dictionary may include not only phrases representative of labels to be applied to choices but also phrases representative of display modes of choices. As an example of phrases representative of such display modes, phrases representative of display positions in a screen image for choices are available. In particular, in the example of FIG. 3, a plurality of choices are disposed in an upwardly, downwardly, leftwardly, and rightwardly juxtaposed relationship. In this case, in the label dictionary, phrases representative of positions such as "up," "down," "right," and "left" may be included. This makes it possible for the user to select "pool" displayed in the upward direction by uttering, for example, "up." Otherwise, a phrase representative of a display mode may include a phrase such as a numeral or an ordinal number indicative of displaying order. This makes it possible for the user to select, even in the case where labels of numerals are not added to choices, a choice designated by a number by uttering a phrase indicative of the number or an ordinal number such as "number one," "first" or the like. Further, in the case where choices are displayed in different letter colors or background colors, the label dictionary may include names (for example, "red," "blue" or the like) of the letter colors or background colors (display colors). This makes it possible for the user to designate a choice by its display color.

In both the first example and the second example described above, dictionaries associated with choices are used to perform matching regarding whether or not utterance contents of the user coincide with a specific phrase. However, in both cases, dictionaries including only limited phrases are used. Therefore, in comparison with a case in which a dictionary including an unspecified large number of phrases is used to perform a speech recognition process of a natural language, the processing load is not very high and also the recognition accuracy becomes high. It is to be noted that the selection result specification unit 24 may use the first example and the second example in combination. In this case, the selection result specification unit 24 may compare the phrases included in all the related word dictionaries and the label dictionaries with utterance contents of the user to search for a coincident phrase.

In the foregoing description, it is assumed that utterance contents of the user recognized by the speech recognition unit 23 coincide fully with a phrase included in one of the dictionaries. However, utterance contents of the user may not fully coincide with any of phrases included in the dictionaries from various reasons. Therefore, the selection result specification unit 24 may use various criteria to decide that, even if full coincidence is not determined, utterance contents of the user correspond to a phrase included in a dictionary. In the following, several examples of such criteria are described. It is to be noted that, in the following description, a phrase included in a related word dictionary or a label dictionary (namely, a phrase to be compared with utterance contents of the user by the selection result specification unit 24) is referred to as comparison target phrase. In the case where it is decided that utterance contents of the user correspond to one comparison target phrase depending upon the criteria exemplified in the following description, the selection result specification unit 24 regards that a choice corresponding to the comparison target phrase is selected by the user.

As a first example of a criterion, a criterion regarding a decorative representation is described. The user does not necessarily utter a phrase of a choice or a related phrase or a phrase or the like indicative of a label added to the choice solely and sometimes adds various phrases (decorative representations) before and after the phrase. Especially, in the case where the user utters by an attitude near to that in ordinary conversation, there is the possibility that the user may speak a sentence including a comparison target phrase rather than utter a sole phrase. For example, in the example of FIG. 3, in the case where it is tried to select the pool of the number one, it is supposed that the user utters contents including a phrase of a choice, a phrase indicative of a label or the like at part thereof like "is it a pool?," "is it the number one," "it's the number one" or the like. Also in such a case as just described, it is demanded for the selection result specification unit 24 to correctly specify a selection result of the user. Therefore, in the case where some phoneme string included in the utterance contents of the user coincides with the comparison target phrase, the selection result specification unit 24 specifies the choice corresponding to the coincident comparison target phrase as a selection result. Where the selection result specification unit 24 decides whether some phrase from within the entire utterance of the user matches with the comparison target phrase, the user can perform utterance for selecting a choice in an attitude near to that in natural conversation.

Now, as the second example, a criterion regarding a fluctuation of expression is described. Utterance contents of the user are sometimes recognized as a phrase that does not coincide fully with a comparison target phrase although it is near to the comparison target phrase from a false recognition in the speech recognition process, a habit of utterance of the user or the like. In order to cope with such cases as just described, in the case where a displacement in pattern determined in advance occurs as a fluctuation of expression between a comparison target phrase and utterance contents of the user, the selection result specification unit 24 decides that they are coincident with each other.

As a particular example, in the case where speaking of the user is poor, especially consonants are sometimes misrecognized. Therefore, in the case where utterance contents of the user and a comparison target phrase coincide in vowels with each other, the selection result specification unit 24 may decide that they coincide with each other even if they do not coincide in consonants with each other. As an example, in the case where such a phrase as "iki," "ishi" or the like is included in the utterance contents of the user, the selection result specification unit 24 may estimate that the user has uttered "ichi" in Japanese and specify the first choice as a comparison target phrase. Meanwhile, in the case where "peach" of an English word is included in a comparison target phrase and a different phrase that is different only in some consonant like "beach" is included in an utterance recognition result regarding the utterance contents of the user, the selection result specification unit 24 may specify "peach" as a selection result.

Further, in the case where a phrase where a long tone is removed from utterance contents of the user coincides with a comparison target phrase, the selection result specification unit 24 may decide that they correspond to each other. For example, in the case where the user utters "iichi" in Japanese, the selection result specification unit 24 specifies the first choice as a selection result. Similarly, in other languages such as English or the like, in the case where the user utters a phrase in which the same vowel appears successively like "alphaaa," the selection result specification unit 24 may decide that a comparison target phrase that is shortened in vowel is selected. Further, in the case where a phrase includes a sound that varies depending upon an accent, a dialect or the like, the selection result specification unit 24 may use a criterion for deciding that such a phrase whose sound varies as just described corresponds to a comparison target phrase. For example, "shigaku" of an utterance of the user may be decided that it signifies "shikaku" of Japanese. Further, in the case where there is a difference in manner of pronunciation of a same word between British English and American English, a phrase having such a changed phrase may be decided that it corresponds to the comparison target phrase. In particular, it is known that there is a difference in manner of pronunciation between British English and American English like the pronunciation of the first i in vitamin or the pronunciation of the first h of herb. By comparing a comparison target phrase and utterance contents of the user using such a criterion as described above, it can be decided that such a phrase as described above corresponds to the comparison target phrase even if all of phrases that change in representation due to a dialect or the like are not included in dictionaries.

Now, as a third example, a criterion of partial coincidence is described. In this example, in the case where a comparison target phrase and utterance contents of the user partially coincide with each other within a range of a predetermined reference, the selection result specification unit 24 decides that both of them correspond to each other. For example, a person's name is sometimes called by nickname that does not coincide in latter portion thereof with the original name although its front portion coincide with that of the original name. In particular, the name "Marusasu" may possibly be called "Maruchan," "Marukun," "Marusan" or the like. Meanwhile, "Christina" may possibly be called "Chris," "Chrissie" or the like. Therefore, in the case where a phrase that coincides at a predetermined number of phonemes at the top thereof or at a predetermined ratio of phonemes at the top thereof with the comparison target phrase is included in utterance contents of the user, the selection result specification unit 24 decides that the utterance contents of the user and the comparison target phrase correspond to each other. If the selection result specification unit 24 decides in this manner, then in the case where the user uses an expression in which part of a phrase of a choice is changed, a selection result can be specified correctly even if such a changed expression is not registered exhaustively in a dictionary. It is to be noted that this is not limited to personal names, but also in the case of a phrase whose ending conjugates or the like such as a case in which the phrase of a choice is "cute" and the user utters "cuty" or the like, a selection result of the user can be specified by a similar criterion.

The criteria described hereinabove may be used in combination. This makes it possible for the selection result specification unit 24 to specify a selection result of the user even if the user performs utterance for selecting a choice by various expressions.

As described hereinabove, the agent processing unit 21 determines a succeeding speech of the agent in response to a selection result specified by the selection result specification unit 24. Further, the agent processing unit 21 may change later speech in response not only to a selection result of the user but also to an emotion or an attitude of the user read from the selection utterance. As a technique for deciding an emotion or an attitude of the user from utterance contents, a known technique can be used.

In particular, the agent processing unit 21 estimates an emotion of the user using feature amounts of para-language information calculated from a sound signal obtained by recording the selection utterance. The para-language information may include a speech speed, a sound volume (sound pressure), an intonation of voice, an intonation (a phrase or the like emphasized by the user), a wording (a polite tone, an informal tone or the like), a speech volume and so forth. Further, various kinds of information obtained not only from a sound signal acquired by the microphone 15 but also from videos picked up by the camera 17 may be utilized. As information obtained from videos, a facial expression, a line of sight, a twinkling, a behavior (gesture) such as nodding or hand movement and so forth are available.

Further, the agent processing unit 21 may calculate an elapsed time period (hereinafter referred to as thinking time period) after choices are presented until the user starts selection utterance as one of feature amounts and use the thinking time period for an evaluation process of the emotion. It is estimated that, as the thinking time period decreases, the user selects a choice with a decreasing hesitation, and it is considered that, as the thinking time period increases, the user is hesitated more upon selection. By referring to such information, the emotion of the user can be read. In the case where the thinking time period is used to evaluate the emotion of the user, the evaluation reference may be changed in response to the presentation order when a selection result selected by the user is presented as a choice. In the case where a plurality of choices are displayed on the screen, it is considered that the user views the choices in order from above to determine which choice is to be selected. In short, it is supposed that time is required until the user looks through choices presented later. Therefore, in the case where a choice presented later is specified as a selection result, the agent processing unit 21 evaluates the emotion such that the thinking time period is shorter than the actual thinking time period in comparison with that in the case where a choice presented earlier is specified as a selection result. This makes it possible to perform evaluation in response to the time period after the user views a choice until the user performs selection utterance.

Further, as described hereinabove, the user sometimes utters, in selection utterance, a phrase representative of a label in place of uttering the phase itself of a choice. Also in such a case as just described, the evaluation of the emotion may be performed assuming that the phrase indicates the phase of the choice. For example, in the case where the user utters "it's A," if the label A is added to the choice of "cute," then the agent processing unit 21 performs evaluation of the emotion with an evaluation reference similar to that when the user utters "cute." As a result, it can be evaluated whether the user thinks that it is cute from its heart or utters sarcastically or the like. On the other hand, in the case where the label A is added to the choice of "apple," evaluation of the emotion is performed under the assumption that the user speaks about an apple. In this case, there is no necessity to perform such evaluation as whether the speech is an irony or the like.

The agent processing unit 21 may use an evaluation result obtained by the evaluation process of the emotion described above for determination of speech contents or may reflect the evaluation result on some other output contents. For example, in the case where the agent processing unit 21 executes processing of a game, the progress of the game may be changed in response to the evaluation result. In this example, in the case where it is evaluated that the user has performed selection utterance with a strong emotion, an advantageous effect may be generated in the game. Further, the agent processing unit 21 may present the evaluation result itself to the user. Further, depending upon the evaluation result of the emotion, the agent processing unit 21 may change the selection result specified by the selection result specification unit 24. As an example, when the user selects a certain selection result, in the case where, as a result when the evaluation process of the emotion is executed for the selection utterance, it is evaluated that the speech is passive, the agent processing unit 21 may continue processing determining that a different choice is specified as a selection result.

As described above, by utilizing the evaluation result of the emotion, even in the case where one of a plurality of choices is to be selected by the user, the information processing apparatus 1 can variously change later processing contents exceeding the number of choices. Further, by presenting a result of feedback of the evaluation result of the emotion to the user, the information processing apparatus 1 can guide the user so as to naturally make an utterance with emotion. Consequently, although the information processing apparatus 1 causes the user to select a choice, it is possible to cause the user to feel that the user is performing natural communication near to conversation between people.

In the following, timing control of conversation by the agent processing unit 21 is described. Usually, after the speech recognition unit 23 detects an end of speech of the user, the agent processing unit 21 determines contents of next speech of the agent on the basis of a result of analysis of contents of the speech and outputs the determined speech. However, that the speech of the user ends cannot sometimes be detected from a cause of noise therearound. Therefore, in the case where an end of speech cannot be detected even if a predetermined period of time elapses after choices are presented, the speech recognition unit 23 may unconditionally end the speech recognition process and execute a next process using a recognition process result of the sound signal acquired till then. Generally, it is considered that, different from a case of free conversation, much time is not required for a response of the user to the presentation of choices, and therefore, it is supposed that, even if the speech recognition process is ended in a predetermined period of time, the possibility that contents of selection of the user may be included in the same is high.

Further, in the case where the speech recognition process is executed on the real time basis during utterance of the user as described above, also the selection result specification unit 24 may perform detection of a phrase corresponding to a comparison target phrase from within the selection utterance using a result of the speech recognition process on the real time basis. If a corresponding phrase is detected as a result of the detection, then since the selection result specification unit 24 can specify a selection result on the basis of the result, the speech recognition process by the speech recognition unit 23 may be interrupted at the point of time. If the speech recognition process is interrupted in this manner, then after the user ends the utterance, the speech of the agent can be reproduced immediately at an appropriate timing and delay of the conversation by the speech recognition process can be avoided. Furthermore, in the case where a state in which an end of utterance of the user cannot be detected continues after specification of a selection result is performed successfully, the agent processing unit 21 may start reproduction of next speech. If specification of a selection result has been performed successfully, then even in the case in which an end of utterance of the user cannot be detected, next conversation receiving a selection utterance of the user can be presented naturally.

Figure 4:
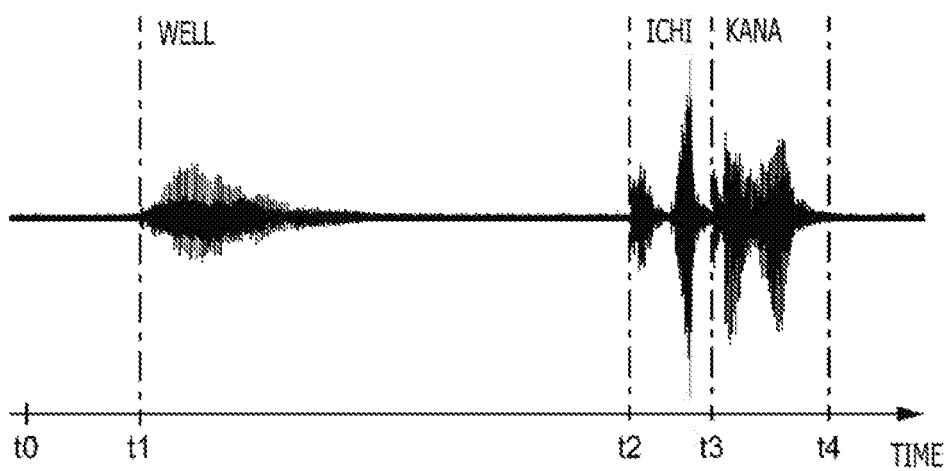
FIG. 4 is a view depicting an example of selection utterance performed by a user.

Particular timing control is described taking FIG. 4 as an example. FIG. 4 depicts an example of selection utterance performed by the user. In the example of this figure, the user starts selection utterance (time t1) a little after a timing (time t0) at which choices are presented and, after, even during the selection utterance, the user performs utterance of a filler at the beginning (namely, utterance that does not make sense linguistically) (time t2), utters a phrase indicative of a label corresponding to the selected choice ("ichi"). Although the utterance of this phrase itself ends at time t3, the user continues the utterance also after then and then ends the utterance at time t4. In such a case as just described, the selection result specification unit 24 can use, after time t3 elapses, a result of the speech recognition process for the sound signal acquired till then to specify that the user has selected the first choice. If this specification process is completed before time t4, then the agent processing unit 21 can output a response of the agent to the utterance of the user without causing the user to wait. In this case, the speech recognition unit 23 may interrupt the speech recognition process for later selection utterance at the point of time at which the selection result specification unit 24 completes the specification of a selection result. Further, the agent processing unit 21 may execute an evaluation process of the emotion of the user using the sound signal obtained before time t3.

It is to be noted that the agent processing unit 21 may execute the evaluation process for the emotion independently for an utterance portion specified as a selection result by the selection result specification unit 24 (after time t2 till time t3 in the example of FIG. 4) and portions before and after the utterance portion. This makes it possible to perform evaluation of each of the emotion for a state in which the user hesitates in selection, another state in which the determined selection contents are being uttered, and a further state after the utterance ends. It is to be noted that the agent processing unit 21 may not perform the evaluation process of the emotion for all of the states but may execute the evaluation process of the emotion only for some of the states.

Further, while the agent processing unit 21 reproduces speech of the agent as voice, the user sometimes wants to obstruct the speech and start speech of the user itself. Especially where the speech time period of the agent becomes long, such a case as just described can occur. Further, if the user is willing to select a choice in a first portion, then it is considered that the user may start selection utterance without hearing later choices. Therefore, also while speech of the agent is being reproduced, the speech recognition unit 23 may monitor the utterance of the user and execute the recognition process of contents of the utterance.

The speech recognition unit 23 may execute such a monitoring process as described above especially in a state in which there is the possibility that the user may utter obstructing the speech of the agent. For example, if the speech of the agent to be reproduced by the agent processing unit 21 is shorter than a predetermined length, then the speech recognition unit 23 may ignore utterance of the user until after the speech of the agent is completed and may monitor utterance of the user in the case where the speech of the agent is equal to or longer than the predetermined length. The predetermined length in this case may be determined, for example, in a unit of the reproduction time period or may be determined depending upon the number of words, number of moras or the like.

Furthermore, the speech recognition unit 23 may change the contents of the detection process of utterance of the user together with time. In particular, it is supposed that, in a state immediately after the agent starts speech, the user wants to obstruct the speech less frequently. On the other hand, it is supposed that, if the speech of the agent continues for a certain period of time, then the desire of the user to obstruct the speech of the agent and start utterance of the user itself increases. Therefore, the speech recognition unit 23 may not perform detection of utterance of the user until speech of a predetermined length is reproduced from a starting point given as time at which the speech of the agent is started, and may monitor utterance of the user after the timing at which the speech of the predetermined length is reproduced. Further, although monitoring itself is started at the time at which speech of the agent is started, the detection reference when it is detected that the user has performed utterance obstructing the speech of the agent may be changed before and after the speech of the predetermined length is performed. In particular, for example, the agent processing unit 21 may stop speech of the agent only in the case where, before the agent ends the speech of the predetermined length, the speech recognition unit 23 detects that the user utters a phrase determined in advance such as "stop," but may stop, in a state in which the agent speaks exceeding the predetermined length, the speech of the agent in the case where it is decided that the user has performed some utterance.

Figure 5:
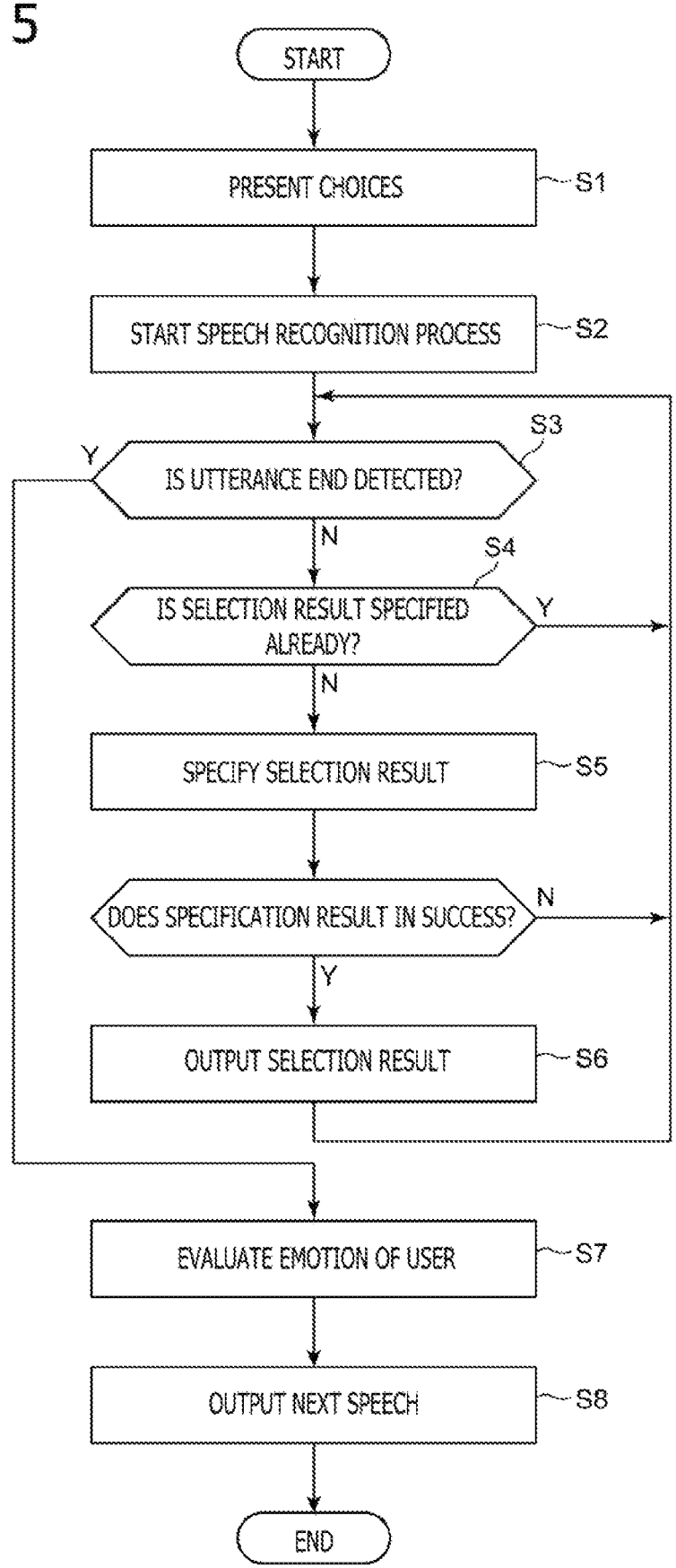
FIG. 5 is a flow chart depicting an example of a flow of processing executed by the information processing apparatus according to the embodiment of the present invention.

In the following, an example of a flow of processing executed by the information processing apparatus 1 according to the present embodiment is described with reference to a flow chart of FIG. 5.

First, the agent processing unit 21 causes a question to the user and a plurality of choices that become candidates for an answer to the question to be displayed on the screen of the display apparatus 14 and presented to the user (S1). Thereafter, acquisition of a sound signal by the sound signal acquisition unit 22 and a speech recognition process for the sound signal acquired by the speech recognition unit 23 are started (S2). While the user is performing selection utterance, every time a predetermined period of time passes, the speech recognition unit 23 decides whether or not the utterance of the user ends (S3). In particular, the speech recognition unit 23 decides that the utterance of the user ends in the case where the voice of the user cannot be detected for a fixed period of time or a period of time more than the predetermined period of time passes after the presentation of choices at S1.

If the utterance of the user does not end, then it is decided whether or not the selection result specification unit 24 has specified a selection result of the user (S4). If the selection result is specified, then the process returns to S3 to repeat the processes until an end of the utterance of the user is detected. If the selection result is not specified, then the selection result specification unit 24 compares a result of the speech recognition process obtained till then with the comparison target phrase included in the dictionary to attempt to specify the selection result (S5). If the selection result can be specified, then the selection result specification unit 24 outputs the selection result to the agent processing unit 21 (S6). Thereafter, the process returns to S3 to perform a decision of whether or not the utterance of the user ends.

In the case where the utterance of the user ends at S3, the agent processing unit 21 executes an evaluation process for evaluating the emotion of the user on the basis of the sound signal obtained till then (S7). Then, the agent processing unit 21 determines contents of a next speech of the agent on the basis of the selection result of the user output at S6 and the result of the evaluation process of the emotion at S7 and outputs the contents (S8). Consequently, conversation according to the selection of the user is performed.

It is to be noted that, while the process in the case where the agent processing unit 21 presents choices to a user is described in the foregoing description, the process is not limited to this, and the agent processing unit 21 may present a question to which an arbitrary answer can be made to the user without presenting choices. Further, the agent processing unit 21 may first present a question to which an arbitrary answer can be made and present, when it fails to recognize an answer of the user to the question, choices of answer candidates to the question.

With the information processing apparatus 1 according to the present embodiment described hereinabove, by presenting choices, contents of an answer of the user can be narrowed and the possibility of misrecognition can be reduced. On the other hand, even in the case in which the user does not answer a phrase of a choice itself, since it is possible to specify which choice is indicated by the answer of the user, it is possible to urge the user to make an answer in natural speech.

It is to be noted that the embodiment of the present invention is not limited to that described above. While, in the foregoing description, it is described that choices are presented together with an answer of the agent, the information processing apparatus 1 may merely present a question and choices without depending upon the agent.

Further, while, in the foregoing description, it is described that the local information processing apparatus 1 in the proximity of the user executes all determination of contents of speech of the agent, a speech recognition process, specification of a selection result, an evaluation process of the emotion and so forth, part or all of the processes may be executed by a server apparatus connected through a communication network. Especially, in the case where the server apparatus determines choices and performs a speech recognition process of a sound signal obtained from the local terminal apparatus to specify a selection result, this server apparatus functions as the information processing apparatus in the present invention.

REFERENCE SIGNS LIST

1 Information processing apparatus, 11 Control unit, 12 Storage unit, 13 Interface unit, 14 Display apparatus, 15 Microphone, 16 Speaker, 17 Camera, 21 Agent processing unit, 22 Sound signal acquisition unit, 23 Speech recognition unit, 24 Selection result specification unit.

The invention claimed is:

1. An information processing apparatus comprising:
   a choice presentation unit configured to present a plurality of choices to a user;
   a speech recognition unit configured to recognize utterance contents of the user for selecting one of the plurality of choices;
   a selection result specification unit configured to specify the choice selected by the user based on whether or not a phrase included in the recognized utterance contents of the user corresponds to a phrase included in a dictionary corresponding to each of the plurality of choices prepared in advance; and
   an outputting unit configured to calculate a feature amount of a sound signal including the utterance of the user to evaluate an emotion of the user and perform outputting according to a result of the evaluation of the emotion and the choice selected by the user.

2. The information processing apparatus according to claim 1, wherein the dictionary corresponding to each of the plurality of choices includes at least one of phrases relating to the phrase of the choice and phrases obtained by translating the phrase of the choice into a different language.

3. The information processing apparatus according to claim 1, wherein
the choice presentation unit adds, to each of the plurality of choices, a label for identifying the choice and presents the choices to the user, and
the dictionary corresponding to each of the plurality of choices includes a phrase indicative of a label added to the choice.

4. The information processing apparatus according to claim 1, wherein the dictionary corresponding to each of the plurality of choices includes a phrase indicative of a displaying mode of the choice.

5. The information processing apparatus according to claim 4, wherein the phrase indicative of the displaying mode of the choice includes at least one of a displaying position, a displaying order, and a displaying color of the choice.

6. The information processing apparatus according to claim 1, wherein, where the phrase included in the utterance contents coincides with some of the phrases included in the dictionary, the selection result specification unit decides that both of the phrases correspond to each other.

7. The information processing apparatus according to claim 1, wherein, where a displacement between the phrase included in the utterance contents and a phrase included in the dictionary corresponds to a pattern determined in advance, the selection result specification unit decides that both of the phrases correspond to each other.

8. The information processing apparatus according to claim 1, further comprising:
an outputting unit configured to calculate a feature amount of a sound signal including the utterance of the user to evaluate an emotion of the user and perform outputting according to a result of the evaluation of the emotion and the choice selected by the user.

9. The information processing apparatus according to claim 1, wherein
the feature amount includes an elapsed time period until the user performs utterance for selecting one of the plurality of choices after the plurality of choices are presented to the user, and,
when the emotion of the user is to be evaluated using the elapsed time period, the outputting unit varies an evaluation reference according to a presentation order when the choice specified by the selection result specification unit is presented to the user.

10. The information processing apparatus according to claim 1, further comprising:
a reproduction unit configured to reproduce speech to be presented to the user by voice, wherein,
where the speech recognition unit detects the utterance of the user during the reproduction of the speech, the reproduction unit stops the reproduction of the speech.

11. The information processing apparatus according to claim 10, wherein the speech recognition unit determines whether or not the utterance of the user is to be detected during the reproduction of the speech in response to a length of the speech.

12. The information processing apparatus according to claim 10, wherein the speech recognition unit varies a detection reference for the utterance of the user in response to an elapsed time period after the reproduction of the speech is started.

13. An information processing method comprising:
presenting a plurality of choices to a user;
recognizing utterance contents of the user for selecting one of the plurality of choices;
specifying a choice selected by the user based on whether or not a phrase included in the recognized utterance contents of the user corresponds to a phrase included in a dictionary corresponding to each of the plurality of choices prepared in advance; and
calculating a feature amount of a sound signal including the utterance of the user to evaluate an emotion of the user and performing outputting according to a result of the evaluation of the emotion and the choice selected by the user.

14. A non-transitory, computer-readable information storage medium storing a program, the program when executed by a computer, causing the computer to implement actions, comprising:
by a choice presentation unit, presenting a plurality of choices to a user;
by a speech recognition unit, recognizing utterance contents of the user for selecting one of the plurality of choices;
by a selection result specification unit, specifying the choice selected by the user based on whether or not a phrase included in the recognized utterance contents of the user corresponds to a phrase included in a dictionary corresponding to each of the plurality of choices prepared in advance; and
by an outputting unit, calculating a feature amount of a sound signal including the utterance of the user to evaluate an emotion of the user and performing outputting according to a result of the evaluation of the emotion and the choice selected by the user.

\* \* \* \* \*